United States Patent
Ogata et al.

(10) Patent No.: US 9,133,771 B2
(45) Date of Patent: Sep. 15, 2015

(54) FUEL SUPPLY DEVICE OF GAS TURBINE ENGINE

(75) Inventors: Hideki Ogata, Kakogawa (JP); Kazuhiko Ohyama, Akashi (JP); Tomoyuki Hatano, Akashi (JP); Akihiro Shimizu, Akashi (JP); Touya Miwa, Kobe (JP)

(73) Assignee: Kawasaki Jukogyo Kabushiki Kaisha, Kobe-shi (JP)

( * ) Notice: Subject to any disclaimer, the term of this patent is extended or adjusted under 35 U.S.C. 154(b) by 549 days.

(21) Appl. No.: 13/576,634

(22) PCT Filed: Feb. 1, 2011

(86) PCT No.: PCT/JP2011/000552
§ 371 (c)(1),
(2), (4) Date: Sep. 13, 2012

(87) PCT Pub. No.: WO2011/096197
PCT Pub. Date: Aug. 11, 2011

(65) Prior Publication Data
US 2012/0324895 A1 Dec. 27, 2012

(30) Foreign Application Priority Data

Feb. 2, 2010 (JP) ................................ 2010-021385

(51) Int. Cl.
*F02C 7/232* (2006.01)
*F02C 9/34* (2006.01)
(Continued)

(52) U.S. Cl.
CPC ................. *F02C 7/232* (2013.01); *F02C 7/228* (2013.01); *F02C 9/34* (2013.01); *F23K 5/06* (2013.01);
(Continued)

(58) Field of Classification Search
CPC ............ F02C 7/22; F02C 7/222; F02C 7/228; F02C 7/232; F02C 9/263; F02C 9/28; F02C 9/32; F02C 9/34
USPC ............................................... 60/39.281, 734
See application file for complete search history.

(56) References Cited

U.S. PATENT DOCUMENTS 3,750,396 A 8/1973 Tucker
4,027,473 A 6/1977 Baker
(Continued)

FOREIGN PATENT DOCUMENTS

JP 4853109 7/1973
JP 52113414 9/1977
(Continued)

OTHER PUBLICATIONS

ISA Japan, International Search Report of PCT/JP2011/000552, Apr. 19, 2011, WIPO, 2 pages.

*Primary Examiner* — Phutthiwat Wongwian
*Assistant Examiner* — Marc Amar
(74) *Attorney, Agent, or Firm* — Alleman Hall McCoy Russell & Tuttle LLP (57) ABSTRACT

A fuel supply device of a gas turbine engine is provided. The fuel supply device includes a fuel divider which divides fuel supplied from a collecting fuel passage to feed the fuel to a pilot fuel passage and to a main fuel passage. The fuel divider includes a movable member which is movable according to fuel pressure at the fuel entrance and opens and closes pilot ports and main ports according to a distance of the movement of the movable member. When the fuel pressure at the fuel entrance is not higher than a predetermined value, the fuel is supplied only to the pilot fuel passage, while when the fuel pressure at the fuel entrance is higher than the predetermined value, the fuel is supplied to the pilot fuel passage and to the main fuel passage.

8 Claims, 9 Drawing Sheets (51) Int. Cl.
*F02C 7/228* (2006.01)
*F23K 5/06* (2006.01)
*F23N 1/00* (2006.01)
*F23R 3/28* (2006.01)
*F23R 3/34* (2006.01)
*F23K 5/14* (2006.01)

(52) U.S. Cl.
CPC ............... *F23K 5/147* (2013.01); *F23N 1/007* (2013.01); *F23R 3/28* (2013.01); *F23R 3/343* (2013.01); *F23K 2301/206* (2013.01); *F23N 2035/24* (2013.01); *F23N 2037/02* (2013.01); *F23N 2037/10* (2013.01); *Y02T 50/672* (2013.01)

(56) References Cited

U.S. PATENT DOCUMENTS

| 4,614,202 | A | 9/1986 | Halvorsen et al. | |
|---|---|---|---|---|
| 5,402,634 | A | 4/1995 | Marshall | |
| 2008/0245074 | A1* | 10/2008 | Oda et al. ........................ | 60/737 |

FOREIGN PATENT DOCUMENTS

| JP | 5865378 | 4/1983 |
|---|---|---|
| JP | 05052124 | 3/1993 |
| JP | 9504088 | 4/1997 |
| JP | 2008255897 | 10/2008 |

\* cited by examiner

FUEL SUPPLY DEVICE OF GAS TURBINE ENGINE

TECHNICAL FIELD

The present invention relates to a fuel supply device of a gas turbine engine for supplying a fuel to a combustor including pilot burners and main burners.

BACKGROUND ART

For environment protection purposes, in gas turbine engines, strict environmental standards are set for the composition of emitted combustion exhaust gas. It is required that harmful substances such as nitrogen oxide (hereinafter expressed as $NO_x$) are reduced from the exhaust gas. In large-sized gas turbines and engines for aircraft, a pressure ratio tends to be set high, because of the requirements of low fuel consumption and high power output. Correspondingly, air at an entrance of a fuel supply device tends to be placed in higher temperature and higher pressure conditions. With an increase in the temperature of the air at the entrance of the fuel supply device, a combustion temperature rises, which may undesirably result in an increase in the amount of $NO_x$ in the exhaust gas.

Under these circumstances, in recent years, there has been proposed a combined combustion method in which two combustion methods, i.e., a lean pre-mixed combustion method which can reduce the amount of $NO_x$ generation effectively, and a diffusion combustion method which has high ignition performance and high flame stabilizing performance are combined. In the lean pre-mixed combustion method, air and fuel are pre-mixed and an air-fuel mixture with a uniform fuel concentration is combusted. In this method, a combustion zone in which a flame temperature is locally high does not exist. In addition, the flame temperature can be lowered as a whole because of lean fuel. Therefore, the lean pre-mixed combustion method has an advantage in that the amount of $NO_x$ generation can be reduced effectively. However, in the lean pre-mixed combustion method, since a great amount of air and fuel are mixed uniformly, a local combustion concentration in a combustion zone is very low, which degrades combustion stability particularly under a low load state. By comparison, in the diffusion combustion method, the fuel and the air are combusted while being diffused and mixed. This method has advantages in that a flame is less likely to vanish even during the low load state, and the flame stabilizing performance is high. Therefore, in the combined combustion method which is a combination of the lean pre-mixed combustion method and the diffusion combustion method, combustion stability in a diffusion combustion zone can be maintained during starting or during the low load state, and the amount of $NO_x$ generation in a lean pre-mixed combustion zone can be reduced during a high load state.

A fuel supply device according to the combined combustion method includes pilot burners which inject fuel spray so as to form the diffusion combustion zone within a combustion chamber by the diffusion combustion method, and main burners which supply an air-fuel mixture containing pre-mixed fuel and air so as to form a pre-mixed combustion zone within the combustion chamber by the lean pre-mixed combustion method. In this fuel supply device, fuel is supplied only to the pilot burners during starting or during the low load state, while the fuel is also supplied to the main burners in addition to the pilot burners during the high load state. When the gas turbine engine transitions from the low load state to the high load state, the fuel supply device controls a ratio between the fuel supplied to the pilot burners and the fuel supplied to the main burners so that the ratio changes gradually from 1:0 to, for example, 1:9, while maintaining a proper value of the ratio for achievement of stable combustion and reduction of $NO_x$.

In a conventional method, to perform the above complicated control, flow control valves are respectively provided in a pilot fuel passage through which the fuel is supplied to the pilot burners and a main fuel passage through which the fuel is supplied to the main burners, and a controller controls these flow control valves (Patent Literature 1).

However, if the flow control valves are provided in these two fuel passages, respectively, a ratio of the weight and cost of the flow control valves and the controller with respect to weight and cost of the entire engine increases, especially in a small-sized gas turbine for an aircraft, and its influence is non-negligible, although the ratio differs between a gas turbine for an aircraft and a gas turbine for industrial applications, and between a large-sized gas turbine and a small-sized gas turbine. This precludes application of a combined combustion method which requires an additional fuel control system (flow control valves and controller) to the small-sized gas turbine for an aircraft. Further, the addition of the fuel control system causes an increased weight and a complicated structure.

Under these circumstances, the applicant proposes a system in which a fuel divider is provided between a pilot fuel passage through which the fuel is supplied to the pilot burners and a main fuel passage through which the fuel is supplied to the main burners, and a collecting fuel passage through which the fuel is supplied to the pilot fuel passage and to the main fuel passage, and a controller that controls the fuel divider and the fuel passages (Patent Literature 2).

CITATION LIST

Patent Literature

Patent Literature 1: Japanese Laid-Open Patent Application Publication No. Hei. 5-52124
Patent Literature 2: Japanese Patent No. 4220558

SUMMARY OF THE INVENTION

Technical Problem

In a system using the above discussed fuel divider, the fuel is divided to be fed to the pilot fuel passage and to the main fuel passage so that the fuel is fed to the pilot burners and to the main burners. To divide the fuel smoothly and accurately, the fuel divider is required to provide fuel sealing performance. However, it is difficult to ensure the sealing performance in the fuel divider.

An object of the present invention is to provide a fuel supply device of a gas turbine engine with a simple and inexpensive structure which can perform fuel flow control and provide sufficient fuel sealing performance, in a combined combustion method in which two combustion methods, which are a diffusion combustion method and a lean pre-mixed combustion method, are combined.

Solution to Problem

To achieve the above object, a fuel supply device of a gas turbine engine of the present invention, which supplies fuel to a combustor including a fuel injection unit including a pilot burner and a main burner; comprises: a pilot fuel passage through which the fuel is supplied to the pilot burner; a main fuel passage through which the fuel is supplied to the main burner; a collecting fuel passage through which the fuel is supplied to the pilot fuel passage and to the main fuel passage; and a fuel divider which divides the fuel supplied from the collecting fuel passage to be fed to the pilot fuel passage and to the main fuel passage; wherein the fuel divider includes: a fuel entrance into which the fuel supplied from the collecting fuel passage is introduced; a pilot port connected to the pilot fuel passage; a main port connected to the main fuel passage; and a movable member which is movable according to a fuel pressure at the fuel entrance; and opens and closes the pilot port and the main port according to a distance of movement of the movable member; wherein when the fuel pressure at the fuel entrance is not higher than a predetermined value, the fuel is supplied only to the pilot fuel passage; and when the fuel pressure at the fuel entrance is higher than the predetermined value, the fuel is supplied to the pilot fuel passage and to the main fuel passage.

In accordance with this configuration, the fuel divider automatically adjusts the amount of fuel fed to the pilot fuel passage and to the main fuel passage according to the fuel pressure. This eliminates a need for a flow control valve for controlling each of the fuel for the pilot fuel passage and the fuel for the main fuel passage. Therefore, the structure is simplified, and a complicated control circuit may be dispensed with. In addition, proper diffusion combustion and pre-mixed combustion can be carried out inexpensively.

In the present invention, the pilot port of the fuel divider may include a plurality of pilot ports and the main port of the fuel divider may include a plurality of main ports; and the number of the pilot ports which are open may decrease and the number of the main ports which are closed may decrease, as the fuel pressure at the fuel entrance increases.

In accordance with this configuration, since the plurality of main ports are opened or closed sequentially, and the plurality of pilot ports are opened or closed sequentially, the amount of the fuel fed to the pilot fuel passage and the amount of the fuel fed to the main fuel passage can be adjusted smoothly, in each fuel pressure zone.

In the present invention, the fuel divider may further include a valve element provided in each of the ports to open and close the port; a spring member for pressing the valve element against a valve seat to close the port; and a press-up pin for pressing the valve element up in a direction away from the valve seat against a force applied by the spring member, to open the port; wherein the movable member may have a cam surface; and the movable member may move according to the fuel pressure at the fuel entrance to cause the cam surface to press up the press-up pin, the press-up pin pressed up may cause the valve element to move, and each of the ports may be opened and closed by the movement of the valve element.

In accordance with this configuration, the fuel divider is not actuated by a complicated control circuit, but is actuated automatically according to the fuel pressure. Therefore, flow control failure of the fuel, which would be caused by an incorrect operation of the control circuit, will not take place. In addition, each of the ports is closed in such a manner that the valve element is pressed against the valve seat by the spring member by using a cam mechanism including the cam surface of the movable member and the press-up pin. Thus, each of the ports has a high sealing ability, and thus, sufficient fuel sealing performance can be ensured.

In the present invention, the valve element may be a ball; and the valve seat may be a seal ring made of a material having higher elasticity than the ball. In accordance with this configuration, high fuel sealing performance can be ensured with a simple structure.

In the present invention, each of the ports may be provided in a housing unit; and the movable member may be a piston housed in the housing unit such that the piston is movable in an axial direction of the piston; and the piston may have a cam surface on an outer periphery thereof. In accordance with this configuration, since the housing serves as a cylinder, the piston moves inside the housing according to the fuel pressure at the fuel entrance, and each of the ports is opened or closed according to the movement of the piston, the structure of the fuel divider is simplified.

In the present invention, preferably, the plurality of pilot ports are arranged in the axial direction of the piston; and the plurality of main ports are arranged in the axial direction of the piston. This configuration can achieve a fuel divider having a small size.

Preferably, the piston has the cam channel extending in the axial direction of the piston and defining the cam surface; and the fuel entrance opens inside the cam channel. In this configuration, the amount of the fuel fed to the pilot fuel passage and the amount of the fuel fed to the main fuel passage can be adjusted smoothly according to the fuel pressure.

In the present invention, the fuel injection unit includes a plurality of fuel injection units preferably supplied with the fuel from the pilot fuel passage and from the main fuel passage. In other words, a single fuel divider may supply the fuel to the plurality of fuel injection ports through the pilot fuel passage and the main fuel passage. Alternatively, a plurality of fuel dividers may be provided in such a manner that a collecting fuel passage is provided for each of the plurality of fuel injection units in a one-to-one correspondence; and a fuel manifold, including the pilot fuel passage and the main fuel passage, is independently provided for each of the plurality of fuel injection units. Either a single fuel divider or a plurality of fuel dividers is/are selected suitably, in view of a loss associated with a weight and cost of the fuel divider and the fuel manifold. In the case of the single fuel divider, only one fuel divider is required, while in the case of the plurality of fuel dividers, only a single collecting fuel passage with a great cross-section (for high fuel volume) is required to reach each of the fuel injection units.

Advantageous Effects of the Invention

In accordance with the fuel supply device of the gas turbine engine of the present invention, with a simple and inexpensive structure, the amount of the fuel fed to the pilot fuel passage and the amount of the fuel fed to the main fuel passage can be adjusted smoothly, according to each fuel pressure. In addition, the plurality of pilot ports and the plurality of main ports can ensure sufficient fuel sealing performance.

BRIEF DESCRIPTION OF THE DRAWINGS

FIG. 6C is a cross-sectional view showing the open state of the pilot port.

DESCRIPTION OF THE EMBODIMENT

Figure 1:
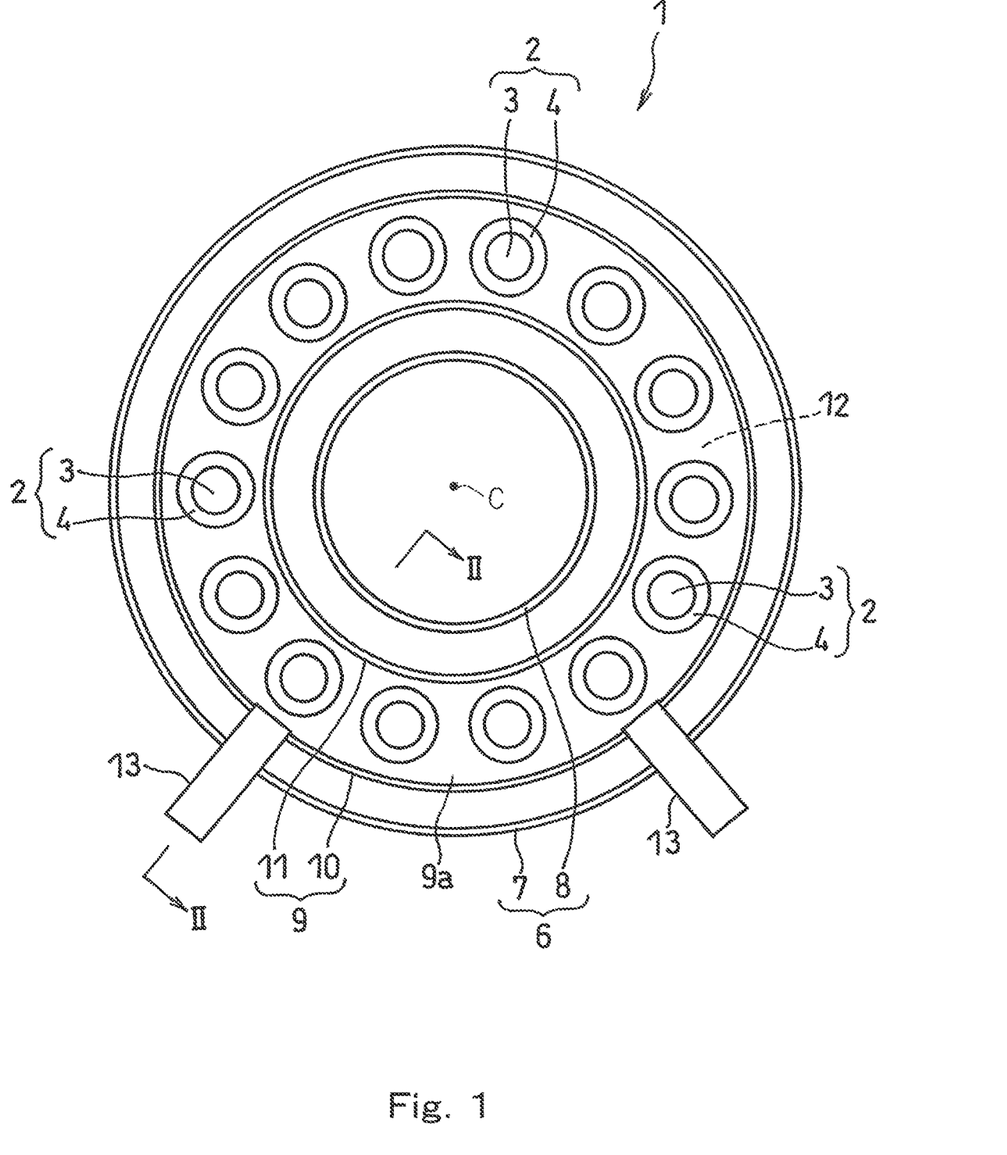
FIG. 1 is a schematic front view showing a fuel supply device of a gas turbine engine according to Embodiment 1 of the present invention.

Hereinafter, a preferred embodiment of the present invention will be described with reference to the drawings. FIG. 1 shows a head portion of a combustor 1 of a gas turbine engine including a fuel supply device according to Embodiment 1 of the present invention. The combustor 1 is configured to combust an air-fuel mixture generated by mixing fuel with compressed air supplied from a compressor (not shown) in a gas turbine engine, and feed high-temperature and high-pressure combustion gas generated by the combustion to a turbine to drive the turbine.

The combustor 1 is an annular type and has a configuration in which a tubular inner casing 8 is disposed inward relative to a tubular outer casing 7 such that the center axis C of the gas turbine engine is a center of the inner casing 8. The outer casing 7 and the inner casing 8 constitute a combustor housing 6 having an annular inner space. In the annular inner space of the combustor housing 6, a tubular inner liner 11 is disposed inward relative to a tubular outer liner 10. These liners 11 and 10 constitute a combustion tube 9. The combustion tube 9 is disposed concentrically with the combustor housing 6. The combustor tube 9 has an annular combustion chamber 12 inside thereof. A plurality (14 in the present embodiment) of fuel injection units 2 for injecting fuel to an interior of the combustion chamber 12 are attached to a top wall 9a of the combustion tube 9. The fuel injection units 2 are arranged at equal intervals on a circle which is concentric with the combustion tube 9. Each of the fuel injection units 2 includes a pilot burner 3 and a main burner 4. The main burner 4 is provided to enclose the outer periphery of the pilot burner 3 such that the main burner 4 is concentric with the pilot burner 3. The pilot burner 3 is a burner for diffusion combustion, while the main burner 4 is a burner for lean pre-mixed combustion. Details of these burners will be described later.

Two ignition plugs 13 for performing ignition extend in a radial direction of the combustion tube 9 to penetrate the outer casing 7 and the outer liner 10, and their tip ends face the fuel injection units 2, respectively. In the combustor 1, a combustible air-fuel mixture injected from each of the two fuel injection units 2 facing the two ignition plugs 13, respectively, is ignited, and then a flame generated by the combustion is transferred to a combustible air-fuel mixture injected from an adjacent fuel injection unit 2, and further to a combustible air-fuel mixture injected from an adjacent fuel injection unit 2. Finally, the flame spreads to the entire periphery.

Figure 2:
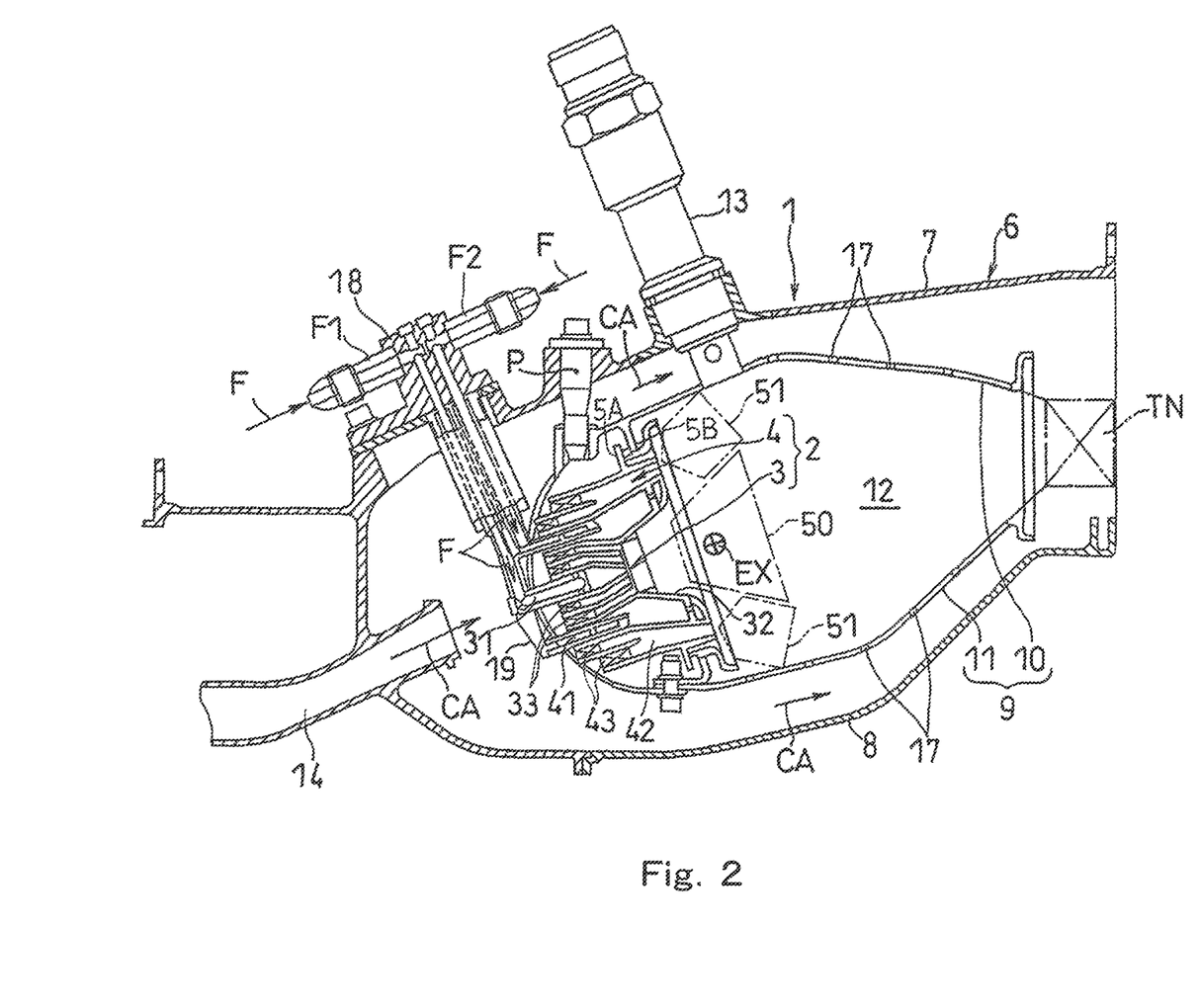
FIG. 2 is an enlarged cross-sectional view taken along line II-II of FIG. 1.

FIG. 2 is an enlarged cross-sectional view taken along line II-II of FIG. 1. Compressed air CA supplied from the compressor is introduced into the annular inner space of the combustor housing 6 via an annular pre-diffuser passage 14. The introduced compressed air CA is supplied to the fuel injection units 2, and to the interior of the combustion chamber 12 through a plurality of air introduction ports 17 provided on each of the outer liner 10 and the inner liner 11 of the combustion tube 9. Fuel pipe units 18 mounted to the outer casing 7 are coupled to a base portion 19 of the combustion tube 9. The fuel pipe units 18 constitute first fuel supply systems F1 for supplying fuel for diffusion combustion to the pilot burners 3 and second fuel supply systems F2 for supplying fuel for lean pre-mixed combustion to the main burners 4. Each of the fuel injection units 2 is mounted to the outer liner 10 via a flange 5A provided at its outer periphery and a support 5B provided at the outer liner 10. The outer liner 10 is mounted to the outer casing 7 by a liner fastening pin P. A first-stage nozzle TN of the turbine is coupled to a downstream end portion of the combustion tube 9.

Each of the pilot burners 3 is provided at a center portion of the corresponding fuel injection unit 2. The pilot burner 3 includes a fuel nozzle 31, a diffusion nozzle 32, and inside and outside swirlers 33. Fuel F for diffusion combustion from the first fuel supply system F1 is injected from the fuel nozzle 31. The fuel F injected from the fuel nozzle 31 is atomized by the compressed air CA which has passed through the swirlers 33, and then is sprayed into the combustion chamber 12 through the diffusion nozzle 32, thereby forming a diffusion combustion zone 50.

The main burner 4 of an annular shape is provided to enclose the outer periphery of the pilot burner 3. The main burner 4 includes fuel nozzles 41 arranged at circumferentially equal intervals, a pre-mixed passage 42, and inside and outside swirlers 43. Fuel F for pre-mixed combustion which is supplied from the second fuel supply system F2 is injected from the fuel nozzles 41 into the pre-mixed passage 42. The fuel F for pre-mixed combustion injected into the pre-mixed passage 42 is mixed with the compressed air CA which has passed through the swirlers 43, and results in a pre-mixed air-fuel mixture. The pre-mixed air-fuel mixture is injected into the combustion chamber 12, thereby forming a pre-mixed combustion zone 51.

The pilot burner 3 is supplied with the fuel F from the first fuel supply system F1 in all load zones. By comparison, the main burner 4 is supplied with the fuel F from the second fuel supply system F2 in a high load zone (high fuel pressure zone) and a medium load zone (medium fuel pressure zone). The high load zone is a load zone which is not less than, for example, 70% of a maximum load. The medium-load zone is between the high load zone and the low load zone (low fuel pressure zone), and is a load zone which is, for example, 40~70% of the maximum load. The main burner 4 is not supplied with the fuel F in the low load zone which is a load zone which is not more than, for example, 40% of the maximum load. Therefore, in this load zone, only the compressed air CA is supplied to the main burner 4 and to the combustion chamber 12.

Figure 3:
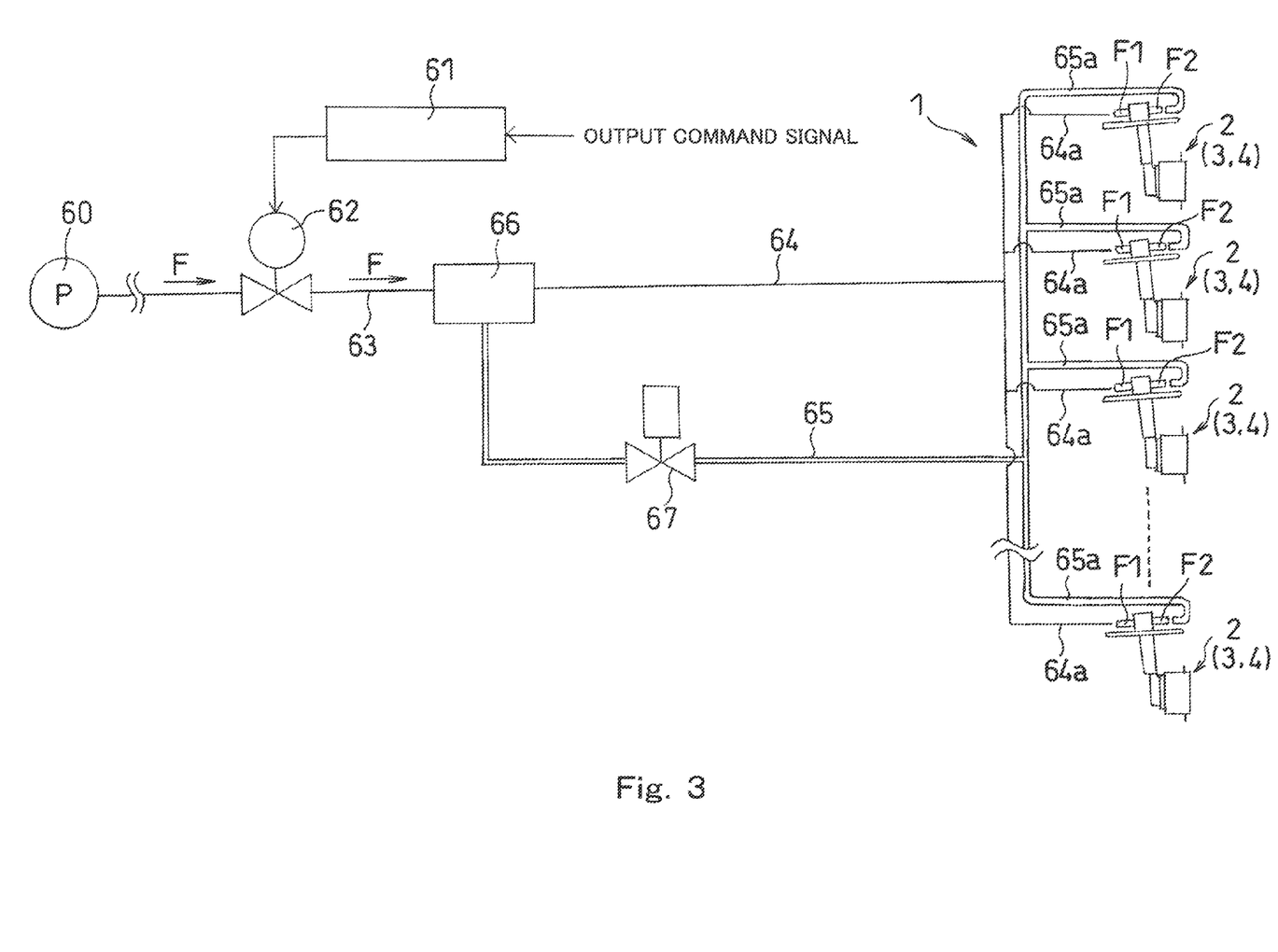
FIG. 3 is a view showing a fuel control system.

Next, a fuel control system of the gas turbine engine will be described with reference to FIG. 3. As shown in FIG. 3, a common pilot fuel passage 64 and a common main fuel passage 65 are connected to the fuel injection units 2 of the combustor 1. The upstream end of the pilot fuel passage 64 and the upstream end of the main fuel passage 65 are connected to a collecting fuel passage 63. The collecting fuel passage 63 is provided with a fuel pump 60 and a total flow control valve 62. The total flow control valve 62 is controlled by a fuel controller 61. The fuel pump 60 is actuated to feed the fuel F to the interior of the collecting fuel passage 63. The fuel controller 61 receives an output command signal by, for example, an operation of a throttle lever provided outside. In accordance with the command signal, the fuel controller 61 sets an opening degree of the total flow control valve 62. By setting the opening degree of the total flow control valve 62 properly, the fuel is supplied to the entire combustor 1 with a required amount via the collecting fuel passage 63, the pilot fuel passage 64, and the main fuel passage 65.

A fuel divider 66 is provided at a branch portion at which the collecting fuel passage 63 branches into the pilot fuel passage 64 and the main fuel passage 65. The pilot fuel passage 64 branches into plural passages (14 passages). The branch passages 64a communicate with the pilot burners 3 via the first fuel supply systems F1 of the corresponding fuel injection units 2, respectively. Likewise, the main fuel passage 65 branches into plural passages (14 passages). The branch passages 65a communicate with the main burners 4 via the second fuel supply systems F2 of the corresponding fuel injection units 2, respectively. The main fuel passage 65 is provided with a cut-off valve 67 which closes the main fuel passage 65 under an engine load state which is not more than a certain load, i.e., in the low load zone including starting of the gas turbine engine. In this configuration, in the low load zone, the main fuel passage 65 is closed more surely, and only the diffusion combustion is conducted by the pilot burners 3. As a result, stability of combustion including ignition performance and flame stabilizing performance can be ensured.

Figure 4:
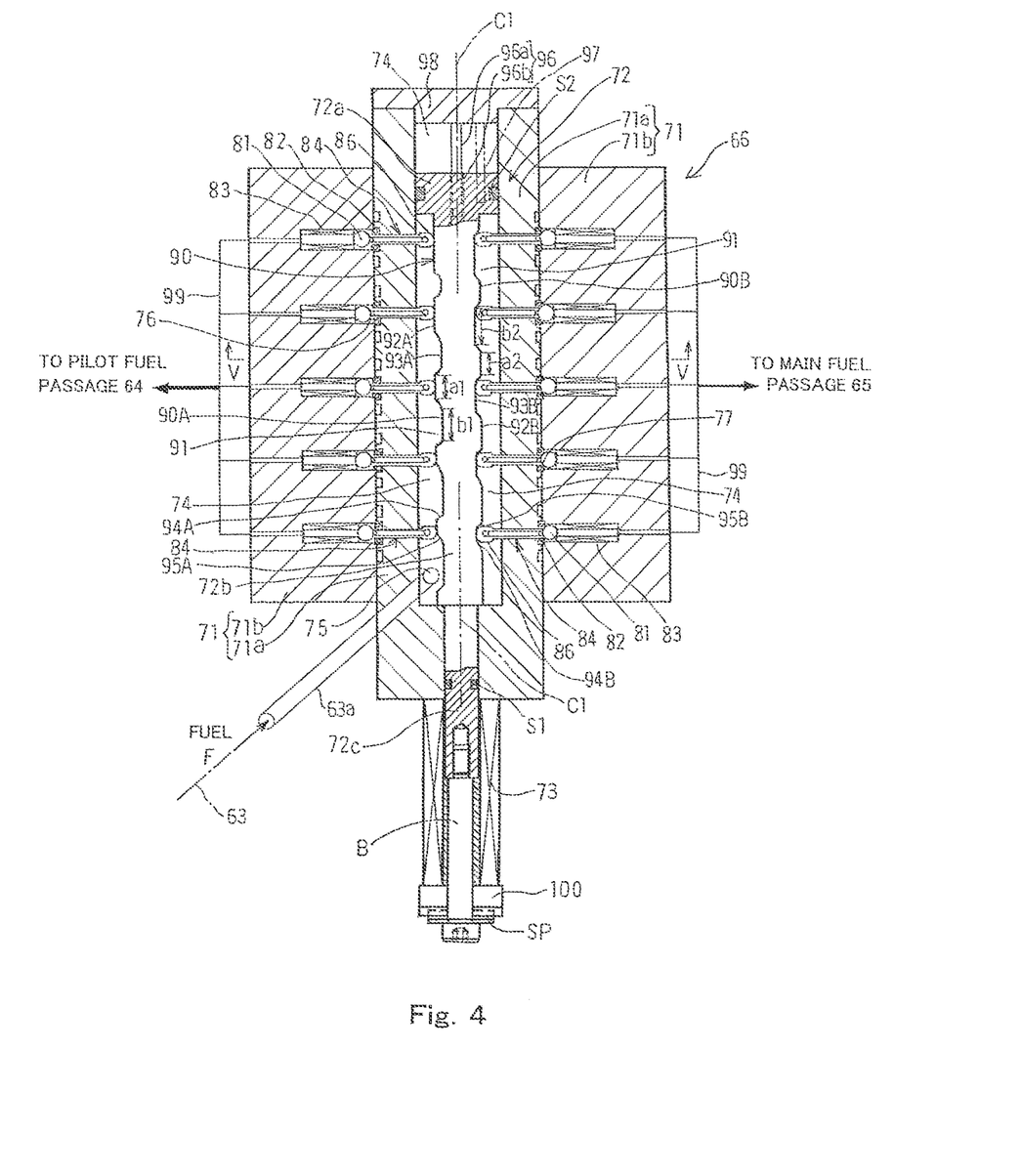
FIG. 4 is a cross-sectional view showing a fuel divider before starting.

FIG. 4 is a cross-sectional view schematically showing the fuel divider 66. As shown in FIG. 4, the fuel divider 66 is of a multi-port type including plural ports, and of a cylinder type formed as a cylinder shape. A housing unit 71 includes a cylindrical inner housing 71a forming a cylinder, and a tubular outer housing 71b enclosing the outer periphery of the inner housing 71a. The upper end of the inner housing 71a is closed by a lid member 98. A movable member 72, which is movable in an axial direction C1, is inserted into a hollow portion 74 of the inner housing 71a. The movable member 72 includes a piston having a piston head 72a having a larger diameter at a tip end (upper end) and a piston body 72b having a smaller diameter and following the piston head 72a. The piston body 72b has a cam surface 90, as described later.

The piston body 72b is provided at a base end (lower end) with a piston rod 72c penetrating the inner housing 71a and protruding axially outward. A bolt B is threaded into a protruding end portion of the piston rod 72c. A spring receiver seat 100 is fitted to the bolt B. A coil-shaped compressive return spring member 73 is mounted between the lower surface of the inner housing 71a and the spring receiver seat 100. The return spring member 73 applies a force to the movable member 72 in a downward direction of FIG. 4. By changing a thickness of a spacer SP interposed between the bolt B and the spring receiver seat 100, an initial strain amount of the return spring member 73 is adjusted.

A cam channel 91 is formed between the cam surface 90 of the piston body 72b and the inner housing 71a. The cam channel 91 extends in the axial direction C1 of the housing unit 71. A downstream portion 63a of the collecting fuel passage 63 penetrates the inner housing 71a and the outer housing 71b. A fuel entrance (inlet) 75 located at a tip end of the downstream portion 63a opens toward the hollow portion 74, i.e., the cam channel 91. Because of this, the fuel F is introduced from the collecting fuel passage 63 into the cam channel 91. The inner housing 71a and the outer housing 71b of the housing unit 71 are each provided with plural (ten) passages extending radially. Among these passages, five passages at the left side connect the pilot fuel passage 64 to the hollow portion 74 (cam channel 91), thereby forming pilot ports 76. The pilot ports 76 are arranged in the axial direction of the piston 72. Among these passages, five passages at the right side connect the main fuel passage 65 to the hollow portion 74 (cam channel 91), thereby forming main ports 77. The main ports 77 are arranged in the axial direction of the piston 72.

Figure 6A:
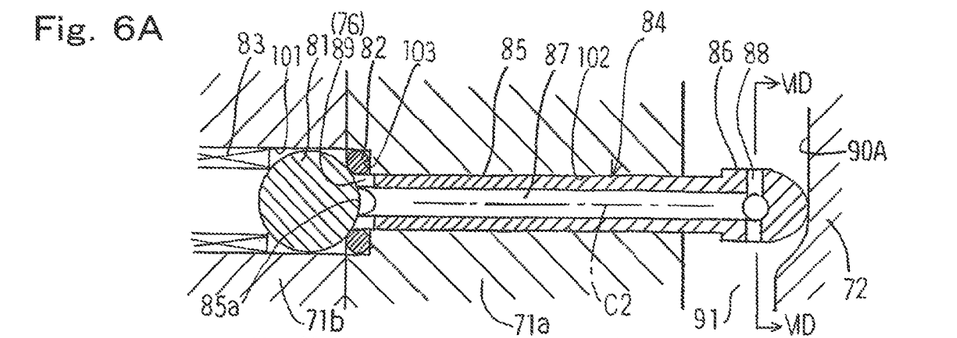
FIG. 6A is a cross-sectional view showing a closed state of a pilot port of the fuel divider.
Figure 6B:
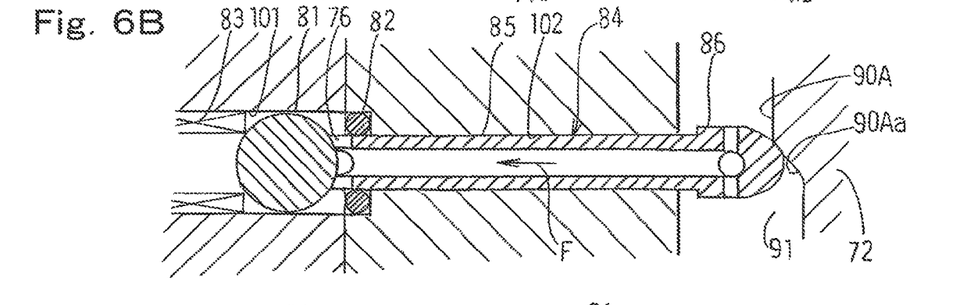
FIG. 6B is a cross-sectional view showing a transition state from a closed state of the pilot port to an open state of the pilot port.
Figure 6C:
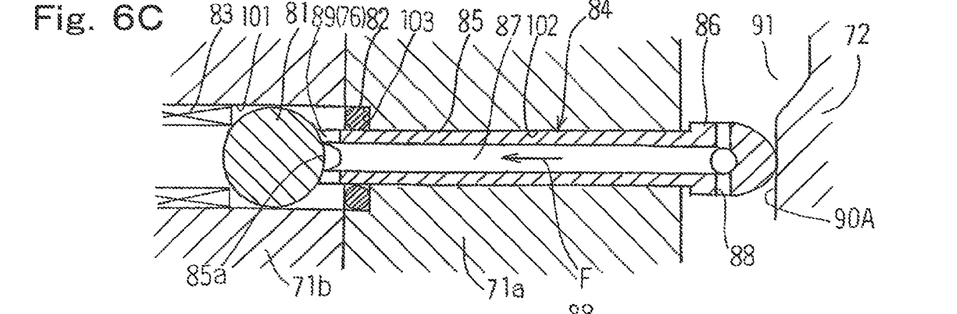
Figure 6D:
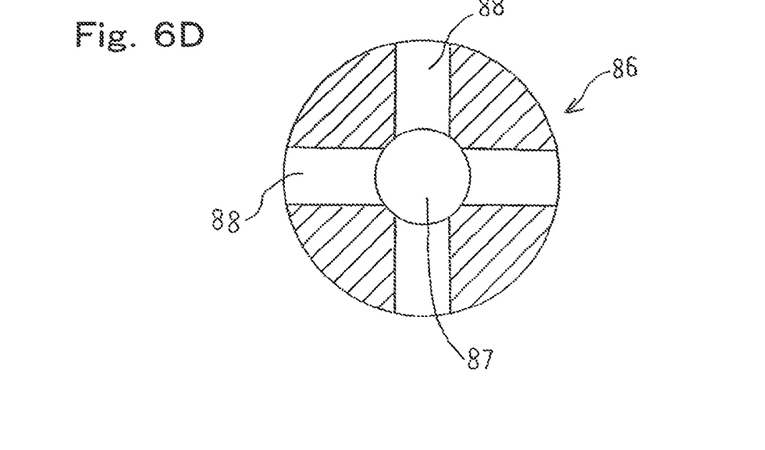
FIG. 6D is a cross-sectional view taken along line VID-VID of FIG. 6A.

Structures in the vicinity of the pilot ports 76 and the main ports 77 provided in the housing unit 71 of the fuel divider 66 have the same structure. Hereinafter, one of pilot ports 76 will be described in detail. FIGS. 6A~6C are cross-sectional views each showing a region in the vicinity of the pilot port 76. FIG. 6A shows a closed state of the pilot port 76, FIG. 6B shows a transition state from the closed state of the pilot port 76 to an open state of the pilot port 76, FIG. 6C shows the open state of the pilot port 76, and FIG. 6D is a cross-sectional view taken along line VID-VID of FIG. 6A.

As shown in FIG. 6A, the inner housing 71a has pin holes 102 having a circular cross-section. The outer housing 71b has valve holes 101 having a circular cross-section with a greater diameter than the pin holes 102. The inner housing 71a has recesses 103 connecting the holes 102 and the holes 103 together, respectively. A valve element 81 constituted by a steel-made ball is inserted into each of the valve holes 101. A press-up pin 84 is inserted into each of the pin holes 102 to press-up the corresponding valve element 81 in a direction away from a valve seat 82 to an open state (FIG. 6C). The valve seat 82 is made of a material having a higher elasticity than the valve element 81 and is mounted to the recess 103. A closing spring member 83 constituted by a coil spring is inserted into the valve hole 101 to press the valve element 81 against the valve seat 82, thereby placing the valve element 81 in a closed position. The valve seat 82 is formed of a rubber-made or resin-made seal ring. As shown in FIG. 4, portions of the valve holes 101 which are downstream (at the left side) of the balls 81 are collectively connected into a collecting passage 99, and communicate with the pilot fuel passage 64.

The press-up pin 84 has a tubular pin body 85 extending in a direction perpendicular to a center axis of the inner housing 71a, i.e., center axis C1 of the movable member 72. The pin body 85 is inserted into the pin hole 102 and is movable along a center axis C2. A left base end 85a of the pin body 85 is always in contact with the ball 81. A cam follower 86 is formed integrally with the tip end of the pin body 85. The cam follower 86 has a protrusive shape. The cam follower 86 protrudes into the cam channel 91 and is always in contact with a cam surface 90A of the movable member 72 at a pilot port side. That is, the cam surface 90 of the movable member 72 and the cam follower 86 of the press-up pin 84 constitute a cam mechanism.

A hollow portion 87 of the pin body 85 communicates with the cam channel 91 via through-holes 88 formed in the cam follower 86. As shown in FIG. 6D, the through-holes 88 are formed at plural locations (four locations) to extend radially in a direction perpendicular to the center axis C2. As shown in FIG. 6A, plural introduction ports 89 are formed at a base end of the pin body 85 by cutting the base end at plural (four) locations which are circumferentially spaced apart from each other. The introduction ports 89 constitute the pilot port 76.

As shown in FIG. 4, a seal ring S1 is mounted to the outer peripheral wall of the piston rod 72c at a lower side of the movable member 72, and a seal ring S2 is mounted to the outer peripheral wall of the piston head 72a at a tip end at an upper side of the movable member 72. The seal rings S1 and S2 provide sealing between the movable member 72 and the inner housing 71a. The upper seal ring S2 prevents the fuel F from leaking from the cam channel 91 into the upper hollow portion 74 of the inner housing 71a. The lower seal ring S1 prevents the fuel F from leaking outside in a downward direction of the fuel divider 66.

When a fuel pressure at the fuel entrance 75 is sufficiently low, the valve element 81 is pressed against the valve seat 82 by the closing spring member 83, and is in a closed position, as shown in FIG. 6A. At this time, the cam follower 86 of the press-up pin 84 is in contact with a recess 93A (described later) of the cam surface 90A. When the fuel pressure rises, the valve element 81 is pressed up by the press-up pin 84 and moves away from the valve seat 82, and the valve element 81 is placed in an open position as shown in FIG. 6B. A cam inclined surface 90Aa, as described later, causes the pin body 85 to move toward the open position. At this time, the hollow portion 87 and the valve hole 101 communicate with each other via the introduction ports 89. When the fuel pressure further rises, the valve element 81 is further pressed up by the press-up pin 84 and further moves away from the valve seat 82, and the pilot 76 is wide open, as shown in FIG. 6C.

Figure 7:
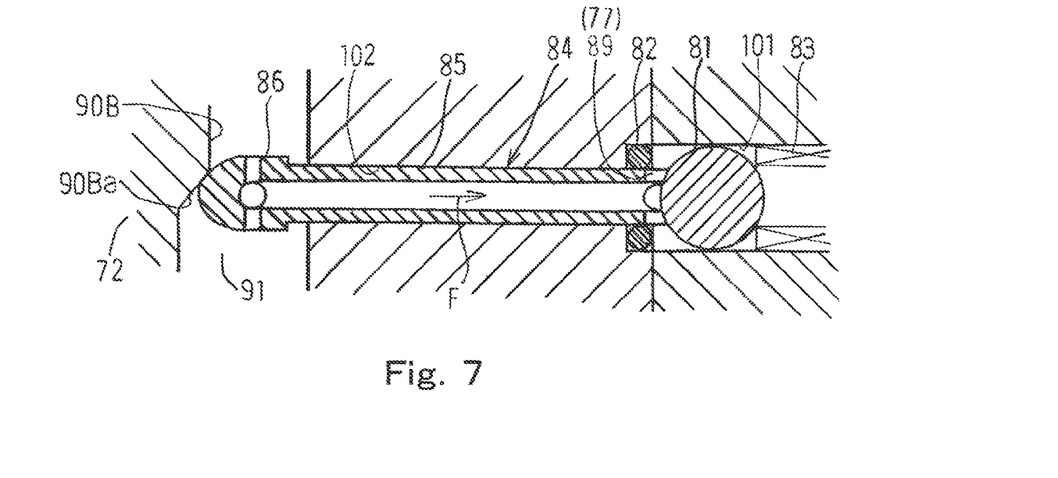
FIG. 7 is a cross-sectional view showing a transition state from a closed state of a main port to an open state of the main port.

FIG. 7 is a cross-sectional view showing a region surrounding the main port 77, and showing a transition state between the closed state of the main port 77 and the open state of the main port 77. FIG. 7 shows a state formed by reversing the state of FIG. 6B in a rightward and leftward direction. In the transition state of the main port 77, the cam follower 86 at the tip end of the pin body 85 protrudes into the cam channel 91 and is in contact with a cam surface 90B of the movable member 72 at a main port side. The valve element 81 is pressed up by the press-up pin 84 and moves away from the valve seat 82. Thus, the valve element 81 is in an open position. A cam inclined surface 90Ba causes the pin body 85 to move toward the open position.

With an increase in the fuel pressure inside the cam channel 91, the cam surface 90A closes the pilot port 76, and the cam surface 90B opens the main port 77 as follows. In a low fuel pressure zone in which the fuel pressure inside the cam channel 91 is low, all of the pilot ports 76 are open. Then, when the fuel pressure inside the cam channel 91 increases and reaches a medium fuel pressure zone, as the movable member 72 moves up, the pilot ports 76 are closed sequentially starting from the lowermost pilot port 76, while the main ports 77 are opened sequentially starting from the lowermost main port 77. In a high fuel pressure zone, as the movable member 72 further moves up, the four pilot ports 76, other than the uppermost pilot port 76, are closed, and all of the main ports 77 are opened.

To open and close the ports 76 and 77 as described above, the pilot port cam surface 90A and the main port cam surface 90B of the movable member 72 have concave-convex surfaces, as described below. The pilot port cam surface 90A of the movable member 72 has convex surfaces 92A which are flat and concave surfaces 93A which are flat such that convex surface 92A and the concave surface 93A are arranged alternately. The convex surface 92A and the concave surface 93A are connected together by a press-up inclined surface 94A or a press-down inclined surface 95A. The pilot port cam surface 90A is configured such that an axial length a1 of the convex surface 92A sequentially increases from a base end toward a tip end (in an upward direction), and an axial length b1 of the concave surface 93A sequentially decreases from the base end toward the tip end (in the upward direction). A boundary between the convex surface 92A and the press-down inclined surface 95A is determined so that, when the press-up pin 84 at a base end side (lower side) of the movable member 72 is placed in a higher fuel pressure state, i.e., the movable member 72 moves up to a higher position, the cam follower 86 starts to contact the press-down inclined surface 95A.

The main port cam surface 90B has convex surfaces 92B which are flat and concave surfaces 93B which are flat such that the convex surface 92B and the concave surface 93B are arranged alternately. The convex surface 92B and the concave surface 93B are connected together by a press-up inclined surface 94B or a press-down inclined surface 95B. The main port cam surface 90B is configured such that an axial length a2 of the convex surface 92B sequentially decreases from the base end toward the tip end (in an upward direction), and an axial length b2 of the concave surface 93B sequentially increases from the base end toward the tip end (in an upward direction). A boundary between the concave surface 93B and the press-up inclined surface 94B is determined so that, when the press-up pin 84 at the base end side (lower side) of the movable member 72 is placed in a higher fuel pressure state, the cam follower 86 starts to contact the press-up inclined surface 94B.

Thereby, as the piston 72 moves, the plurality of pilot ports 76 are sequentially closed or opened, whereas the plurality of main ports 77 are sequentially opened or closed. Therefore, according to the fuel pressure, the ports transition sequentially from the open state to the closed state or from the closed state to the open state smoothly. As a result, the amount of fuel fed to the pilot fuel passage 64 and to the main fuel passage 65 can be adjusted smoothly in the respective fuel pressure zones.

Figure 5:
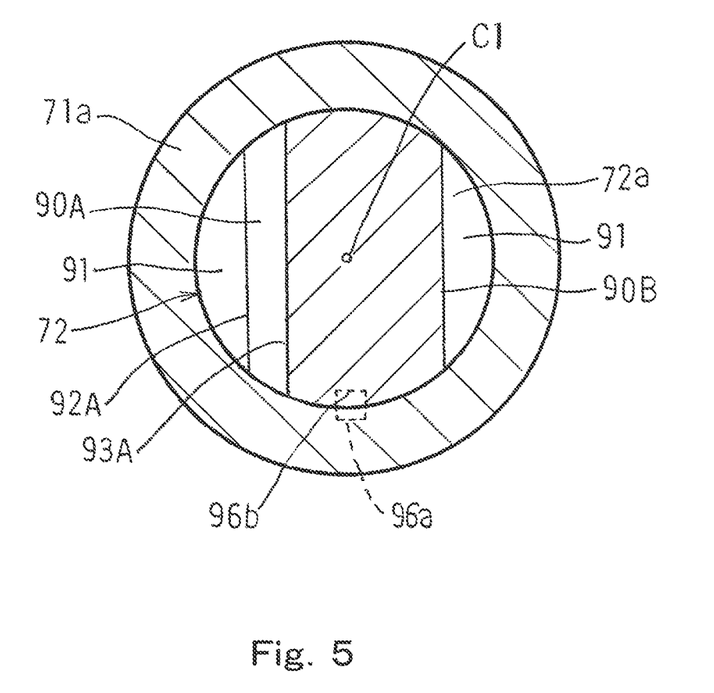
FIG. 5 is an enlarged cross-sectional view taken along line V-V of FIG. 4.

A rotation inhibiting mechanism 96 is provided at a tip end portion (upper portion) of the inner housing 71a. The rotation inhibiting mechanism 96 inhibits the piston 72 from rotating, thereby allowing the pilot port cam surface 90A and the pilot port press-up pins 84 to face each other accurately, and the main port cam surface 90B and the main port press-up pins 84 to face each other accurately. As shown in FIG. 5, the rotation inhibiting mechanism 96 includes a key 96a attached to the inner peripheral surface of the inner housing 71a, extending axially (direction of the center axis C1 of the cylinder), and a key groove 96b formed on the outer peripheral surface of the piston head 72a. The rotation inhibiting mechanism 96 allows the piston 72 to move axially and inhibits the piston 72 from moving circumferentially with respect to the inner housing 71a. As the rotation inhibiting mechanism 96, the following configuration may be used instead of a configuration of the key 96a and the key groove 96b. That is, as indicated by a two-dotted line in FIG. 4, a guide rod 97 extending axially downward may be fixed to the inner housing 71a in a location eccentric from the center axis C1 and may be fitted to the inner housing 71a to be movable axially relative to the piston 72.

Next, the operation of the fuel supply device configured as described above will be described. In the fuel supply device shown in FIG. 3, during operation, the fuel F is introduced by the fuel pump 60 to the collecting fuel passage 63, and the total flow control valve 62 controls the flow rate of the fuel F. Then, the fuel F flows through the fuel divider 66, and is divided to be fed to the pilot fuel passage 64 and to the main fuel passage 65. Then, the fuel F is supplied to the pilot burners 3 and to the main burners 4 of the fuel injection units 2. In this way, the pilot fuel passage 64 and the main fuel passage 65 are common to all of the fuel injection units 2.

In the case of the low fuel pressure zone in which the pressure of the fuel F introduced into the cam channel 91 through the fuel entrance 75 corresponds to the low load zone, a force applied by the spring member 73 is greater than the force for pressing up the piston head 72a due to this fuel pressure, and the movable member 72 is in an initial position which is the lowermost position shown in FIG. 4. In this state, the press-up pins 84 of all of the pilot ports 76 are placed onto the convex surfaces 92A of the pilot cam surface 90A, respectively, as shown in FIG. 6C, and thus, the valve bodies 81 are pressed up and are away from the valve seats 82, respectively. Thereby, the fuel F inside the cam channel 91 flows through the through-holes 88 of the press-up pins 84, the hollow portions 87, and the introduction ports 89 (pilot ports 76), and into the valve holes 101. As shown in FIG. 4, the fuel F in the valve holes 101 is supplied to the pilot fuel passage 64 through the collecting passage 99.

Figure 8:
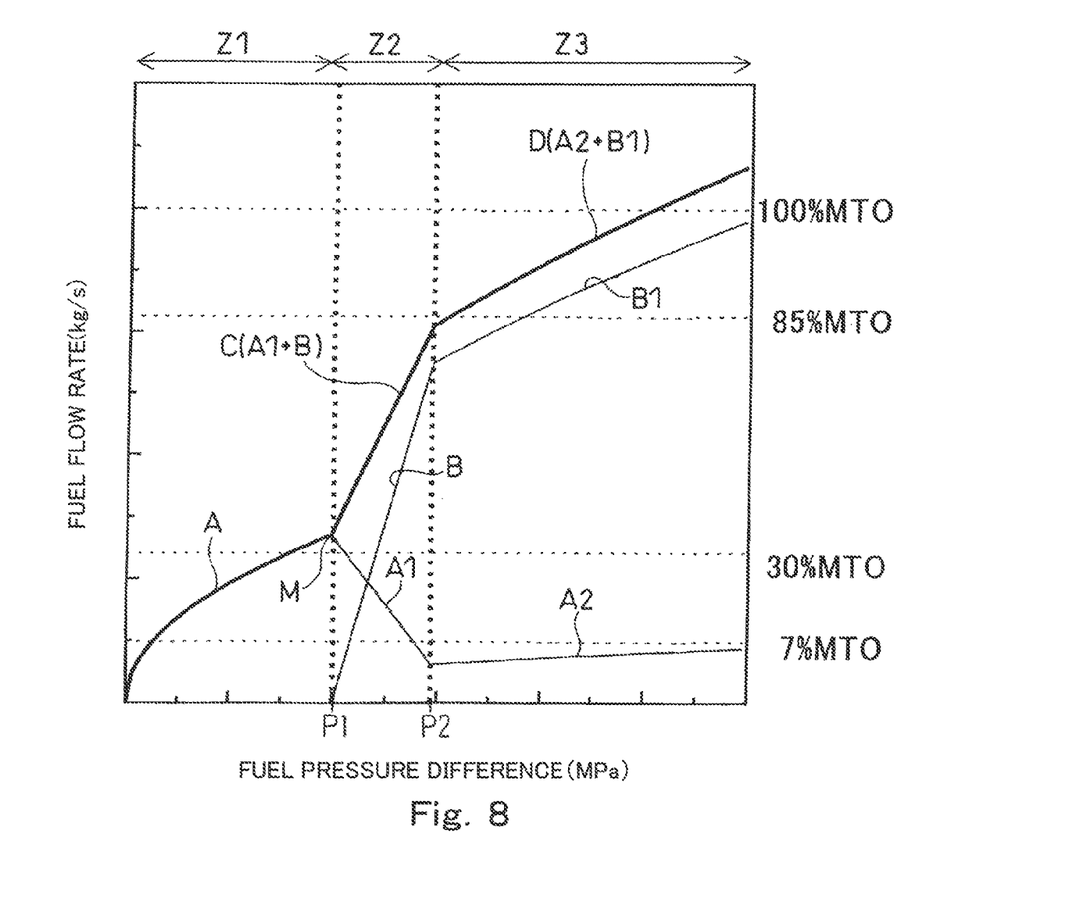
FIG. 8 is a view of a curved line showing a flow rate change associated with a fuel pressure change in the fuel divider.

In FIG. 8, a horizontal axis indicates a pressure difference (hereinafter referred to as "fuel pressure difference") between the pressure at the fuel entrance 75 and the pressure in the combustion chamber 12 (equal to the pressure at an exit (outlet) EX of the pilot burners 3), and a vertical axis indicates the flow rate of the fuel F. The fuel pressure difference corresponds to an engine load. In FIG. 4, a curve line expressed as a bold line indicates a flow rate (hereinafter referred to as "total flow rate") which is a sum of the flow rate of the fuel flowing through the pilot fuel passage 64 and the flow rate of the fuel flowing through the main fuel passage 65. In a low fuel pressure zone Z1 in a state where all of the pilot ports 76 are open, the total flow rate is the flow rate of the fuel flowing through the pilot fuel passage 64. As shown in FIG. 8, in the low fuel pressure zone Z1, as the fuel pressure difference increases, the flow rate of the fuel flowing through the pilot fuel passage 64 increases gradually.

In the low fuel pressure zone Z1, in the fuel injection units 2 shown in FIG. 3, only the pilot burners 3 perform diffusion combustion using the fuel F supplied from the pilot ports 76 through the pilot fuel passage 64. Therefore, combustion is carried out stably with high ignition performance and high flame stabilizing performance. The low load zone Z1 includes a predetermined 30% MTO (Max Take Off).

In the low fuel pressure zone Z1, all of the main ports 77 are closed. In other words, the force applied by the return spring member 73 is greater than the force applied to press up the piston head 72a due to the fuel pressure, and the movable member 72 is in the initial position which is the lowermost position shown in FIG. 4. In this state, the press-up pins 84 of all of the main ports 77 are placed in a down position onto the concave surfaces 93A of the main port cam surface 90A, respectively. Because of this, the valve element 81 in FIG. 7 is pressed against the valve seat 82 by the closing spring body 83 and is in a closed position. Thus, since the ports have high sealing ability in the closed state, fuel sealing performance can be ensured sufficiently when the main ports 77 are closed, particularly in the low fuel pressure zone.

As the fuel pressure difference increases gradually, the movable member 72 starts to move up against the force applied by the return spring member 73 from a location before the fuel pressure difference reaches P1 in FIG. 8. When the fuel pressure difference reaches P1 and falls into a medium fuel pressure zone Z2, the lowermost press-up pin 84 at the pilot port side moves onto the press-down inclined surface 95A from the convex surface 92A, and starts to close the pilot port 76. By comparison, the lowermost press-up pin 84 at the main port side moves onto the press-up inclined surface 94B from the concave surface 93B, and starts to open the main port 77. In the medium fuel pressure zone Z2, the press-up pins 84 at the pilot port side, from the lowermost press-up pin 84 to the press-up pin 84 in the second highest position, move down onto the concave surfaces 93A, respectively, according to an increase in the fuel pressure difference, thereby closing the pilot ports 76. As a result, as indicated by a curve A1 in FIG. 8, the flow rate of the fuel flowing through the pilot fuel passage 64 decreases with an increase in the fuel pressure difference. At a time point of a fuel pressure difference P2 which is the end of the medium fuel pressure zone Z2, only the uppermost pilot port 76 is open.

On the other hand, in the medium fuel pressure zone Z2, the press-up pins 84 at the main port side in FIG. 4 move up onto the convex surfaces 92B through the press-up inclined surfaces 94B sequentially starting from the lowermost press-down pin 84, and open the main ports 77. Thereby, as indicated by the curve B in FIG. 8, the flow rate of the fuel flowing through the main fuel passage 65 increases gradually. At the time point of the fuel pressure difference P2, all of the main ports 77 are opened. In this way, a large part of the fuel F is supplied to the main fuel passage 65, and the remaining part of the fuel F is supplied to the pilot fuel passage 64.

As a result of the above, the fuel injection units 2 are supplied with the fuel F from both of the pilot fuel passage 64 and the main fuel passage 65, and the pilot burners 3 and the main burners 4 are both actuated. A total flow rate indicated by a curve C in the medium load zone Z2 in FIG. 8 is set by the total flow control valve 62. The fuel is supplied to the pilot fuel passage 64 in FIG. 4 in such a manner that the plurality of pilot ports 76 are sequentially closed. This makes it possible to smoothly reduce the flow rate of the fuel flowing through the pilot fuel passage 64.

When the fuel pressure difference reaches a high fuel pressure zone Z3 in FIG. 8, corresponding to a high load, all of the main ports 77 are opened and the fuel F is supplied to the main fuel passage 65. In this state, as the fuel pressure difference rises, the fuel flow rate increases. The pilot fuel passage 64 is supplied with the fuel F only via the uppermost pilot port 76. As the fuel pressure difference rises, the flow rate of the fuel increases in the pilot fuel passage 64. At this time, the fuel F is supplied so that the ratio between the flow rate of the fuel supplied from the pilot ports 76 to the pilot fuel passage 64 and the flow rate of the fuel supplied from the main ports 77 to the main fuel passage 65 is a predetermined ratio 1:9. When the fuel pressures reaches a predetermined fuel pressure or higher, the up-movement of the piston 72 is restricted by the lid member 98, and the piston 72 is inhibited from further moving up.

In the above described manner, in the high load zone Z3 in FIG. 8, the flow rate of the fuel flowing through the pilot fuel passage 64 increases with the fuel pressure difference such that this flow rate is suppressed to about 10% of the total flow rate as indicated by a curve A2, while the flow rate of the fuel flowing through the main fuel passage 65 increases such that this flow rate is maintained at about 90% of the total flow rate as indicated by a curve B1. Note that the load zone Z3 includes a predetermined 85% MTO. In this way, in the high load zone Z3, the main burners 4 primarily perform the pre-mixed combustion while achieving reduced $NO_x$ and the pilot burner 3 secondarily perform diffusion combustion, thereby ensuring combustion stability.

As stated above, in the present invention, by using the fuel divider 66 provided at the branch portion at which the collecting fuel passage 63 branches into the pilot fuel passage 64 and the main fuel passage 65, the amount of the fuel fed to the pilot fuel passage 64 and the amount of the fuel fed to the main fuel passage 65 are adjusted automatically according to the fuel pressure, i.e., the engine load. Thus, the diffusion combustion and the pre-mixed combustion can be carried out appropriately in the combustor 1. Since it is not necessary to provide the flow control valve in each of the pilot fuel passage 64 and the main fuel passage 65, the structure is simplified, and a complicated control circuit may be dispensed with, which results in cost savings. Since the plurality of pilot ports 76 and the plurality of main ports 77 sequentially transition to the open state or the closed state, according to the fuel pressure, the amount of the fuel fed to the pilot fuel passage 64 and the amount of the fuel fed to the main fuel passage 65 can be adjusted smoothly according to each fuel pressure. Furthermore, each port is configured such that the valve element 81 is pressed against the valve seat 82 by the spring member 83 and is placed in the closed position by using the cam mechanism including the cam surface 90 of the movable member 72 and the cam follower 86 of the press-up pin 84. Thus, each port has a high sealing ability, and thus, sufficient fuel sealing performance can be ensured.

Since a simple configuration is attained by using the piston as the movable member 72 and the cylinder as the housing unit 71 such that the piston 72 moves inside the housing unit 71, the structure of the fuel divider 66 is simplified.

Figure 9:
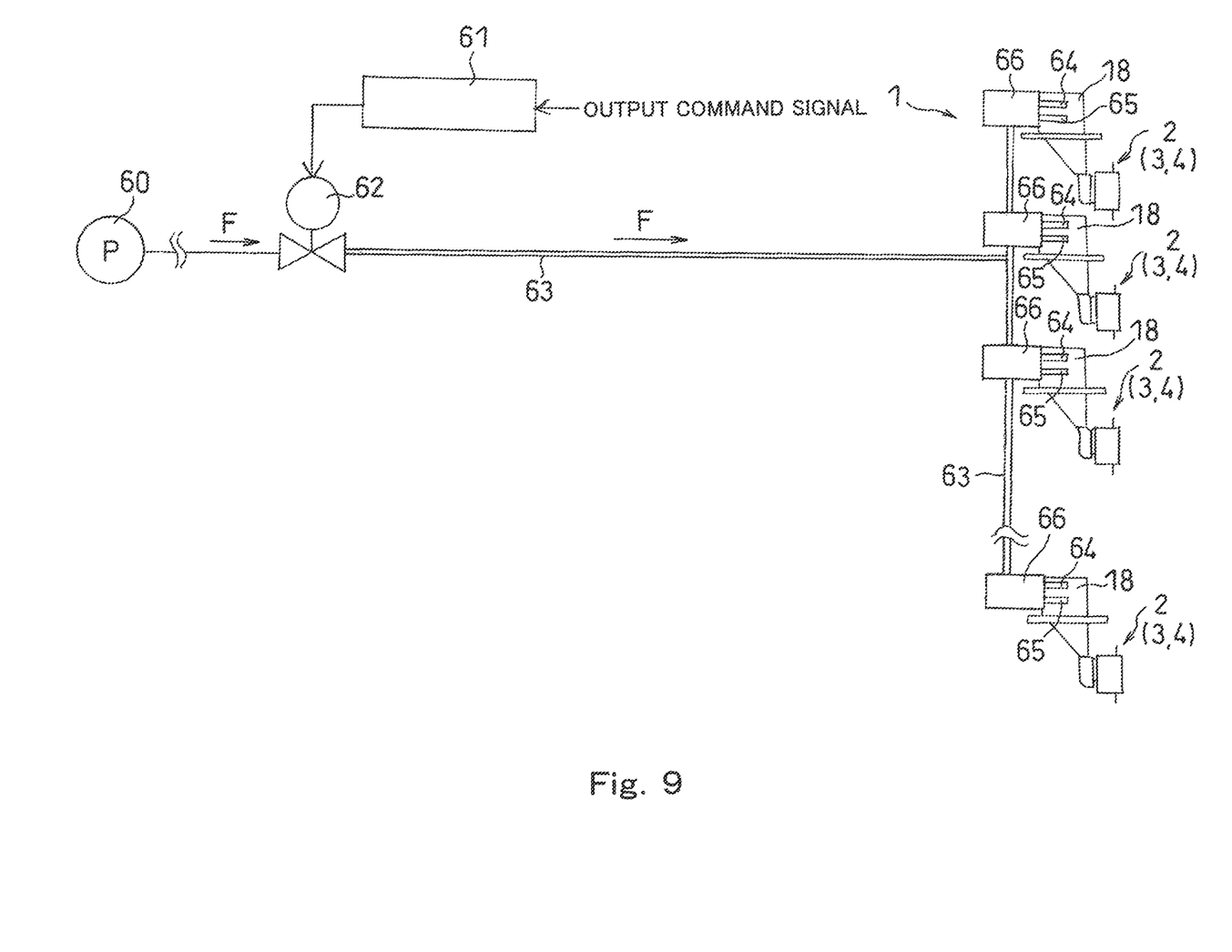
FIG. 9 is a view showing a fuel control system according to Embodiment 2 of the present invention.
Figure 10:
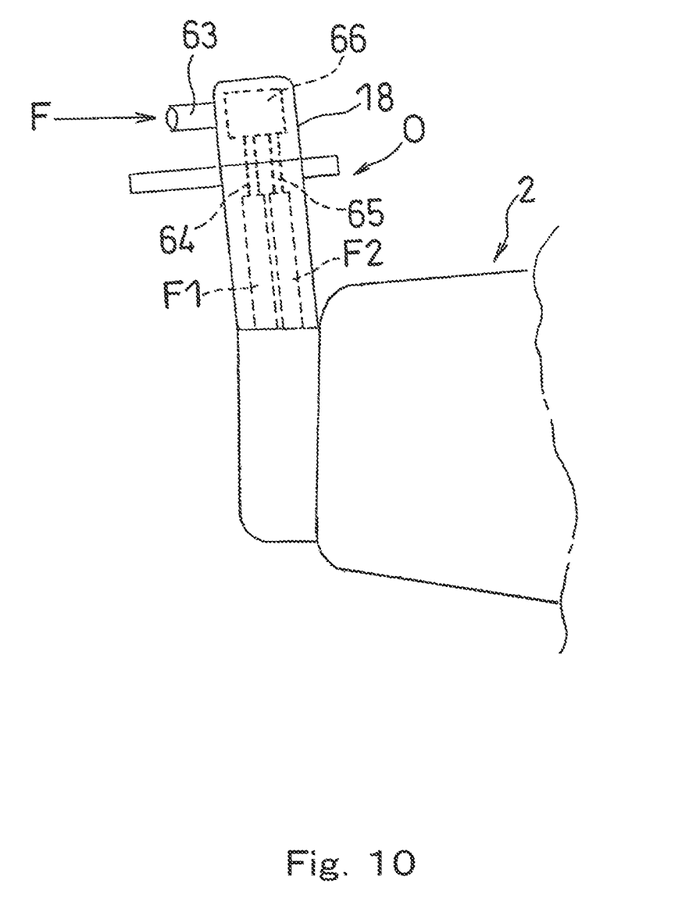
FIG. 10 is an enlarged side view showing major components of the fuel injection unit of FIG. 9.

FIG. 9 is a view showing a fuel control system according to Embodiment 2 of the present invention. In the present embodiment, the collecting fuel passage 63 is extended up to the fuel injection units 2, and the fuel divider 66 is provided for each of the fuel injection units 2 in a one-to-one correspondence. This follows that the pilot fuel passage 64 and the main fuel passage 65 are provided independently for each of the fuel injection units 2. As shown in FIG. 10, the fuel divider 66 is built into, for example, the fuel pipe unit 18 of each of the fuel injection units 2. In this configuration, the single collecting fuel passage 63 with a great cross-section is sufficient to reach each of the fuel injection units 2. This makes it easier to perform a piping work for laying out the fuel passage to the fuel injection units 2 as compared to the configuration in which two fuel passages, i.e., the pilot fuel passage 64 and the main fuel passage 65 are used, as in Embodiment 1. The other operations and advantages of Embodiment 2 are similar to those of Embodiment 1.

In the above embodiments, the combustor is a fuel injection type, but the present invention is not limited to this. For example, the combustor may be of an air blast type. Although the main burner is of the pre-mixed combustion type, it may be of, for example, a diffusion combustion type.

REFERENCE SIGNS LIST

1 combustor
2 fuel injection unit
3 pilot burner
4 main burner
12 combustion chamber
62 total flow control valve
63 collecting fuel passage
64 pilot fuel passage
65 main fuel passage
66 fuel divider
67 cut-off valve
70 fuel supply unit
71 housing (cylinder)
72 movable member (piston)
75 fuel entrance
76 pilot port
77 main port
81 valve element
82 valve seat
83 spring member
84 press-up pin
90 cam surface
91 cam groove
F fuel
Z1 low load zone
Z2 medium load zone
Z3 high load zone

The invention claimed is:

1. A fuel supply device of a gas turbine engine, which supplies fuel to a combustor including a fuel injection unit including a pilot burner and a main burner; the fuel supply device comprising:
 a pilot fuel passage through which the fuel is supplied to the pilot burner;
 a main fuel passage through which the fuel is supplied to the main burner;
 a collecting fuel passage through which the fuel is supplied to the pilot fuel passage and to the main fuel passage; and
 a fuel divider which divides the fuel supplied from the collecting fuel passage to feed the fuel to the pilot fuel passage and to the main fuel passage;
 wherein the fuel divider includes:
  a fuel entrance into which the fuel supplied from the collecting fuel passage is introduced;
  a pilot port connected to the pilot fuel passage;
  a main port connected to the main fuel passage; and
  a movable member which is movable according to a fuel pressure at the fuel entrance; and opens and closes the pilot port and the main port according to a distance of movement of the movable member;
 wherein when the fuel pressure at the fuel entrance is not higher than a predetermined value, the fuel is supplied only to the pilot fuel passage;
 wherein when the fuel pressure at the fuel entrance is higher than the predetermined value, the fuel is supplied to the pilot fuel passage and to the main fuel passage;
 wherein the pilot port of the fuel divider includes a plurality of pilot ports and the main port of the fuel divider includes a plurality of main ports; and
 wherein the number of the pilot ports which are open decreases and the number of the main ports which are closed decreases, as the fuel pressure at the fuel entrance increases.

2. The fuel supply device of the gas turbine engine according to claim 1,
 wherein the fuel divider further includes:
  a valve element provided in each of the ports to open and close the port;
  a spring member for pressing the valve element against a valve seat to close the port; and
  a press-up pin for pressing the valve element up in a direction away from the valve seat against a force applied by the spring member, to open the port;
 wherein the movable member has a cam surface; and
 wherein the movable member moves according to the fuel pressure at the fuel entrance to cause the cam surface to press up on the press-up pin, the press-up pin pressed up causes the valve element to move, and each of the ports is opened and closed by the movement of the valve element.

3. The fuel supply device of the gas turbine engine according to claim 2,
 wherein the valve element is a ball; and
 wherein the valve seat is a seal ring made of a material having higher elasticity than the ball.

4. The fuel supply device of the gas turbine engine according to claim 2,
 wherein each of the ports is provided in a housing unit;
 wherein the movable member is a piston housed in the housing unit such that the piston is movable in an axial direction of the piston; and
 wherein the piston has the cam surface on an outer periphery thereof.

5. The fuel supply device of the gas turbine engine according to claim 4,
 wherein the plurality of pilot ports are arranged in the axial direction of the piston; and
 wherein the plurality of main ports are arranged in the axial direction of the piston.

6. The fuel supply device of the gas turbine engine according to claim 4,
   wherein the piston has a cam channel extending in the axial direction of the piston and defining the cam surface; and
   wherein the fuel entrance opens inside the cam channel.

7. The fuel supply device of the gas turbine engine according to claim 1, wherein the fuel injection unit is one of a plurality of fuel injection units supplied with the fuel from the pilot fuel passage and from the main fuel passage.

8. The fuel supply device of the gas turbine engine according to claim 1,
   wherein the fuel injection unit is one of a plurality of fuel injection units;
   wherein the fuel divider is one of a plurality of fuel dividers, each of the fuel dividers being provided for a respective one of the plurality of fuel injection units such that one fuel divider corresponds to one fuel injection unit; and
   wherein the pilot fuel passage is one of a plurality of pilot fuel passages and the main fuel passage is one of a plurality of main fuel passages, a respective pilot fuel passage and respective main fuel passage being independently provided for each of the plurality of fuel injection units.

* * * * *